United States Patent
Johnson et al.

[19]

[11] Patent Number: 5,825,559
[45] Date of Patent: Oct. 20, 1998

[54] OPTICAL ASSEMBLY HAVING A DUAL PURPOSE FOCUS

[75] Inventors: Glenn W. Johnson, Webster; Nelson D. Hozman, Rochester, both of N.Y.

[73] Assignee: Eastman Kodak Company, Rochester, N.Y.

[21] Appl. No.: 884,400

[22] Filed: Jun. 27, 1997

[51] Int. Cl.$^6$ ...................................................... G02B 7/02
[52] U.S. Cl. .................... 359/819; 359/823; 359/695; 359/699; 396/79; 396/83; 348/73; 348/345
[58] Field of Search ..................... 359/819, 823, 359/695, 699, 700, 701; 396/75, 82, 83, 79; 348/73, 345, 357

[56] References Cited

U.S. PATENT DOCUMENTS

| | | | |
|---|---|---|---|
| 3,696,725 | 10/1972 | Lange ........................................ | 359/823 |
| 4,600,939 | 7/1986 | Sluyter et al. ............................. | 348/73 |
| 4,834,514 | 5/1989 | Atsuta et al. .............................. | 359/823 |
| 4,959,675 | 9/1990 | Seki et al. .................................. | 396/90 |
| 4,972,268 | 11/1990 | Frederick et al. ........................ | 348/357 |
| 4,974,091 | 11/1990 | Frederick .................................. | 348/357 |
| 4,993,815 | 2/1991 | Yamazaki et al. ........................ | 359/823 |
| 5,032,919 | 7/1991 | Randmae .................................. | 348/345 |
| 5,035,493 | 7/1991 | Tanaka ...................................... | 359/701 |
| 5,086,312 | 2/1992 | Tanaka et al. ............................. | 396/75 |
| 5,181,144 | 1/1993 | Shirie et al. ............................... | 396/79 |
| 5,333,024 | 7/1994 | Labaziewicz .............................. | 396/79 |
| 5,337,187 | 8/1994 | Fukino et al. ............................. | 359/699 |
| 5,450,242 | 9/1995 | Kohmoto et al. ......................... | 359/676 |
| 5,475,457 | 12/1995 | Tanaka ...................................... | 396/83 |
| 5,477,387 | 12/1995 | Takayama ................................. | 359/702 |

*Primary Examiner*—Loha Ben
*Attorney, Agent, or Firm*—David M. Woods

[57] ABSTRACT

An optical assembly includes a lens assembly having a lens barrel for supporting a lens along an optical axis, an optical base having an opening aligned with the optical axis, and a plurality of ramps and a corresponding plurality of reference locators circumferentially arranged around the lens assembly and the opening in the optical base in order to slide against one another. A retaining element biases the lens assembly against the optical base with the ramps and the reference locators likewise biased therebetween against each other. Consequently, the ramps and reference locators provide an arrangement for focusing the lens assembly. The optical assembly also includes a factory focus tab attached to the lens assembly and accessible during the manufacturing operation for focusing the lens assembly by moving the ramps against the reference locators, and a focus adjuster assembly accessible during user focus for focusing the lens assembly by moving the ramps against the reference locators. The ramps thereby provide the adjustment of the lens position during both factory focus and user focus of the lens.

17 Claims, 5 Drawing Sheets

OPTICAL ASSEMBLY HAVING A DUAL PURPOSE FOCUS

FIELD OF THE INVENTION

The invention relates generally to the field of photography, and in particular to the adjustment of lenses used in photographic cameras.

BACKGROUND OF THE INVENTION

In order to produce a good (focused) image, it is necessary to accurately position a lens of a camera relative to an image plane in which an image receiver (e.g., a charge-coupled device (CCD) or film) is located. The ideal location of the lens relative to the image plane is dependent on two attributes: the focal length of the lens and the object distance (the distance from the camera to the object that is to be properly focused). The exact focal length of the lens is determined by the lens design and the variations caused by the manufacturing process. These variations typically (at least for lenses with more than two elements) are large enough so that they need to be "factory focused"; that is, each lens needs to be individually positioned (in the factory) relative to a target image plane to accommodate this variation. Then, as the object distance changes during use of the camera, the lens need to be moved relative to the image plane to maintain a best focus position. This is typically achieved by manual (user) focus of the lens or by an autofocus system that automatically focuses the lens.

For user focus of both manual focus and autofocus cameras, the lens is moved relative to the image plane to provide a best focus position for a given object distance. This is typically accomplished using a set of three ramps on the back of the lens mount that are spring biased against three pads on a fixed optics mechanism that supports and positions the lens in the finished assembly. As the lens mount is rotated relative to the optics mechanism, the lens assembly translates relative to the image plane and focuses the image upon the image plane.

Sometimes, the lens is not moved relative to the image plane as the object distance is changed—these are called fixed focus systems. With fixed focus systems, the lens is properly focused for one (best focus) object distance. As the object moves relative to this "best focus" position, and especially as the object moves beyond the depth of field of the lens, the image quality degrades. Whether a camera is fixed focus, manual focus or autofocus, a factory focus operation is normally required. The exceptions to this requirement includes cameras with fewer than three elements (as discussed above) and inexpensive video cameras that are, e.g., tethered to a computer. In these exceptional cases, some products require the user to screw in the lens (via a threaded lens assembly) to find the best focus for a given object.

Typically, a factory focus operation involves screwing a lens assembly into a lens mount, then rotating the lens assembly (several revolutions) until an object target (which is fixtured at a known distance from the camera) is optimally focused at the image plane. Then, the lens assembly is attached (with glue, set screw, etc.) to the lens mount. There are several problems associated with the use of threads on the lens assembly to obtain factory focus. For instance, threads require a more complicated and costly mold. Furthermore, the unscrewing action of the mold increases the cycle time and therefore the cost of the lens barrel. The fine threads on the lens barrel are sometimes difficult to assemble (starting the threads). This can increase the average assembly cycle time (and cost) relative to a non-threaded solution. As the lens barrel requires several revolutions to get the lens close to the focus position, this increases assembly cycle time (and cost) relative to a non-threaded solution.

It would be desirable to have a factory focus procedure that would decrease assembly time without increasing cost.

SUMMARY OF THE INVENTION

The present invention is directed to overcoming one or more of the problems set forth above. Many cameras (as discussed above) utilize a threaded lens barrel to accomplish a factory focus operation and a set of ramps to accomplish a manual focus or autofocus function. This invention departs from the prior art by using a single set of ramps for both the factory focus and the manual/auto focus functions.

Briefly summarized, according to one aspect of the present invention, an optical assembly includes a lens assembly having a lens barrel for supporting a lens along an optical axis, an optical base having an opening aligned with the optical axis, and a plurality of ramps and a corresponding plurality of reference locators circumferentially arranged around the lens assembly and the opening in the optical base in order to slide against one another. A retaining element biases the lens assembly against the optical base with the ramps and the reference locators likewise biased therebetween against each other. Consequently, the ramps and reference locators provide an arrangement for focusing the lens assembly. The optical assembly also includes a factory focus element associated with the lens assembly and accessible during the manufacturing operation for focusing the lens assembly by producing relative movement of the ramps and the reference locators, and a focus adjuster assembly accessible during user focus for focusing the lens assembly by producing relative movement of the ramps and the reference locators. The ramps and the reference locators thereby provide the adjustment of the lens position during both factory focus and user focus of the lens.

The invention also includes, in another aspect, a method for setting the focus of an optical assembly during the assembly process, comprising the steps of:

providing a target object at a known object distance from the optical assembly;

biasing the lens assembly against the optical base such that the ramp surfaces abut the reference locators;

positioning the focus adjuster in a known location associated with the known object distance from the target object;

rotating the lens assembly with the ramp surfaces sliding against the reference locators until the target object is properly focused; and attaching the focus adjuster to the lens assembly.

The advantage of the invention lies in using a single set of ramps for both the factory focus and the manual/auto focus functions. This eliminates the need for having a threaded lens barrel (and the cost associated with it).

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because imaging systems and devices are well known, the present description will be directed in particular to elements forming part of, or cooperating more directly with, apparatus in accordance with the present invention. Elements not specifically shown or described herein may be selected from those known in the art.

Figure 1:
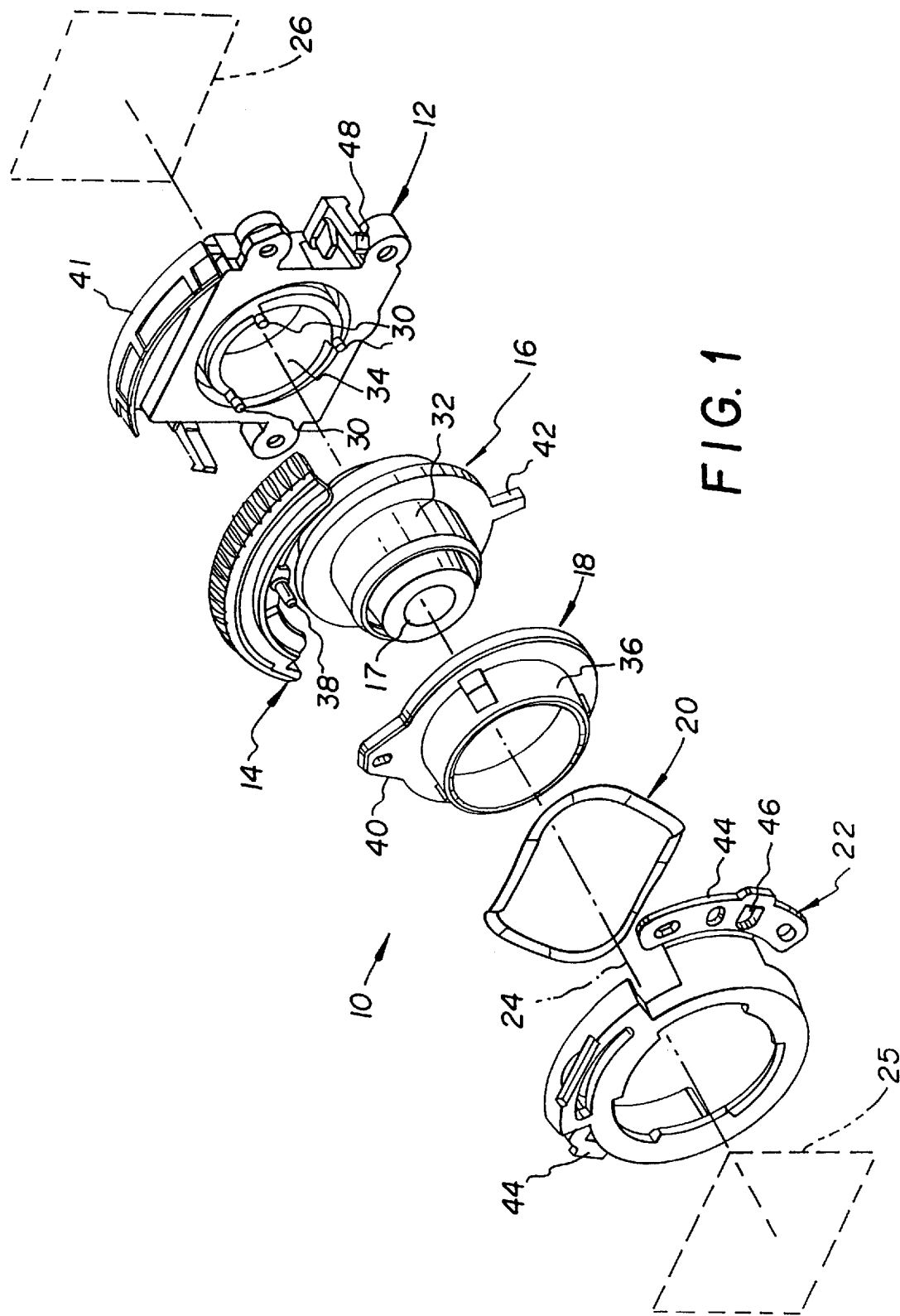
FIG. 1 is an exploded view of an optical assembly showing the components of the assembly and the features of the invention.

An exploded view of an optical assembly 10 according to the invention is shown in FIG. 1. The optical assembly 10 includes an optics base mechanism 12 for supporting the optical assembly, a focus adjuster 14 for user focus, a lens assembly 16 supporting a lens 17 for focusing an image, a focus ring 18, a lens spring 20 and a lens retainer 22 for holding the assembly together. These parts are assembled along an optical axis 24 (z-axis assembly), which intercepts an assembly target 25 and an image plane 26, where an image receiver (not shown), such as a film or a charge coupled device (CCD), is located. The lens 17 thus focuses an image upon the image plane 26, and therefore upon the image receiver (not shown) located in the image plane.

Figure 2:
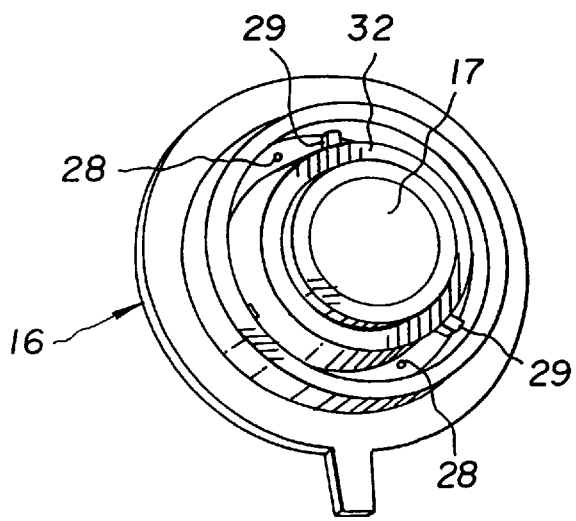
FIG. 2 is a perspective view of a lens assembly shown in FIG. 1, further showing a plurality of ramps according to the invention.
Figure 3:
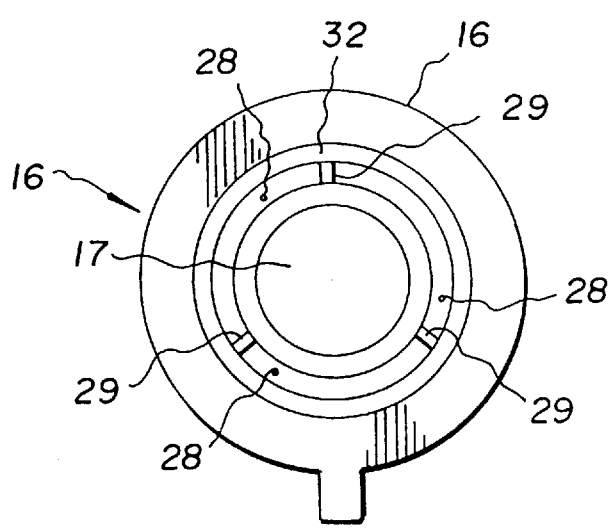
FIG. 3 is a plan view of the lens assembly shown in FIG. 2, further showing the location of the ramps.
Figure 4:
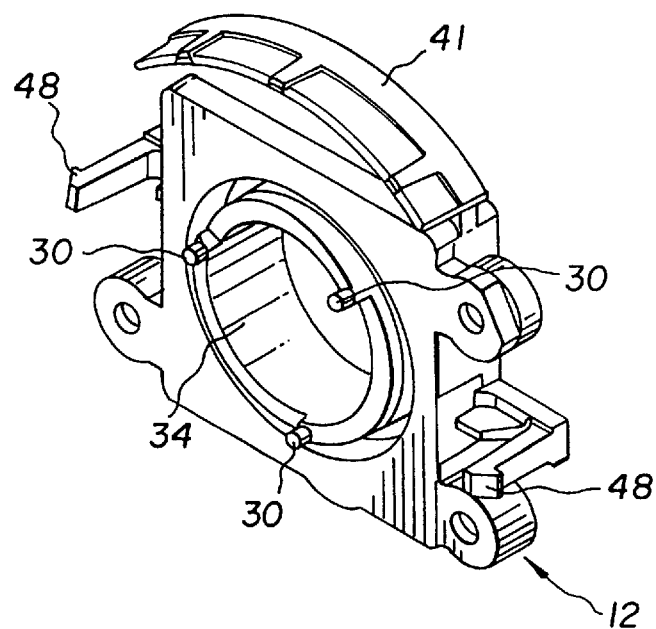
FIG. 4 is a view of an optics base mechanism shown in FIG. 1, further showing a plurality of reference locators situated on the optics base mechanism according to the invention.

As shown in FIGS. 2 and 3, the lens assembly 16 includes a plurality of ramps 28 that are positioned to interface with a corresponding plurality of reference locators 30 situated on the optics base mechanism 12, as shown in FIGS. 1 and 4. Each reference locator 30 is designed as a pin with a spherical surface that contacts a corresponding ramp 28, and each ramp 28 includes a ramp surface set at a particular ramp angle that determines the amount of movement of the lens in the z direction 24 as the lens assembly 16 is rotated. Each ramp 28 includes a stop 29 (see FIGS. 2 and 3) at its raised end to prevent the corresponding pin 30 from sliding off the ramp surface. The ramps 28 are arranged to slide across the reference locators 30 so as to vary the distance of the lens 17 from the image plane 26. The ramps 28 are designed so that they can accommodate the full range of focus as well as all the tolerances associated with the lens (focus length) and other mechanical parts that contribute to positioning of the lens 17 relative to the image receiver in the image plane 26.

The lens 17 is mounted within the lens assembly 16 in a barrel 32 that fits, on one end thereof, into an opening 34 in the optics base mechanism 12 and, on its other end thereof, into an extension 36 of the focus ring 18. The focus adjuster 14 includes a pin 38 that mates with a hole in a tab 40 extending from the focus ring 18. When assembled, the focus adjuster 14 is supported for movement over a shoulder 41 attached to the optics base mechanism 12. The lens assembly 16 also includes a focus feature, such as a focus tab 42, for adjusting the lens assembly 16 during factory focus. (While the focus feature has been shown as a focus tab 42 extending from the lens assembly 16, the feature could take other forms, e.g., a hole in the lens assembly 16, which could be accessed by a factory focusing mechanism.) The lens retainer 22 includes retaining flanges 44 that include holes 46 for receiving mounting clips 48 extending from the optics base mechanism 12.

Figure 5:
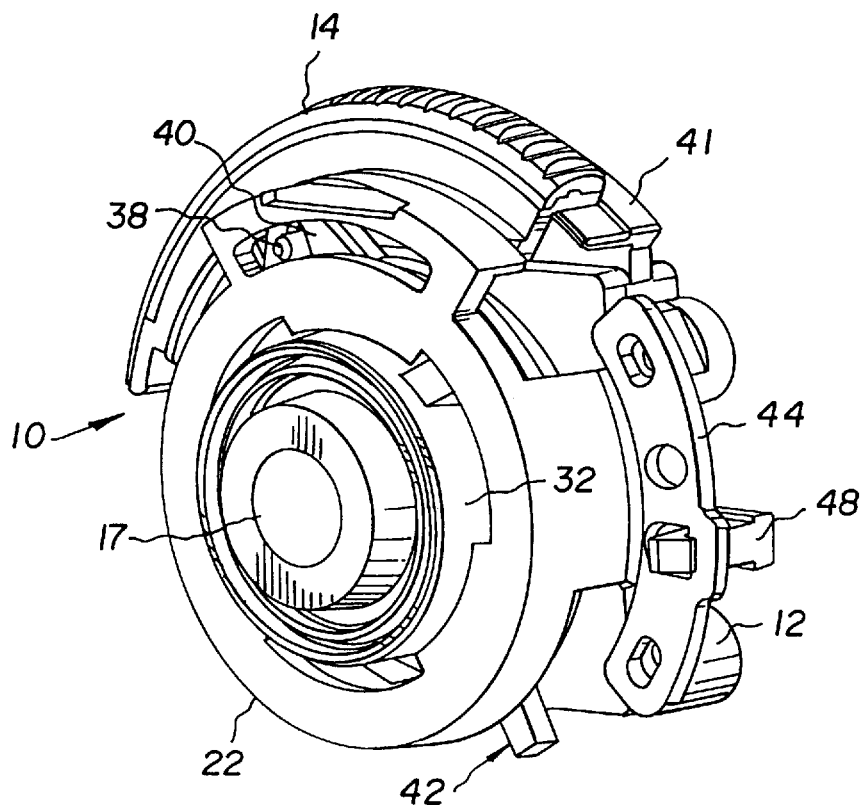
FIG. 5 is an illustration of the fully assembled optical assembly shown in FIG. 1.

The assembled optical assembly 10, as shown in FIG. 5, has the focus tab 42 protruding out from under the lens retainer 22 such that an assembler (or a focus fixture) can reach the tab 42 and rotate the lens assembly 16. In the initial course of assembly, the focus ring 18 is unattached to the lens assembly 16. Therefore, moving the focus tab 42 rotates the lens assembly 16 independent of the focus ring 18 and the focus adjuster 14 that is attached to the focus ring 18 via the tab 40. As will be seen, the movement of the focus ring 18 independently from the lens assembly 16 is important in obtaining factory focus of the lens 17 relative to the target 25.

Figure 6:
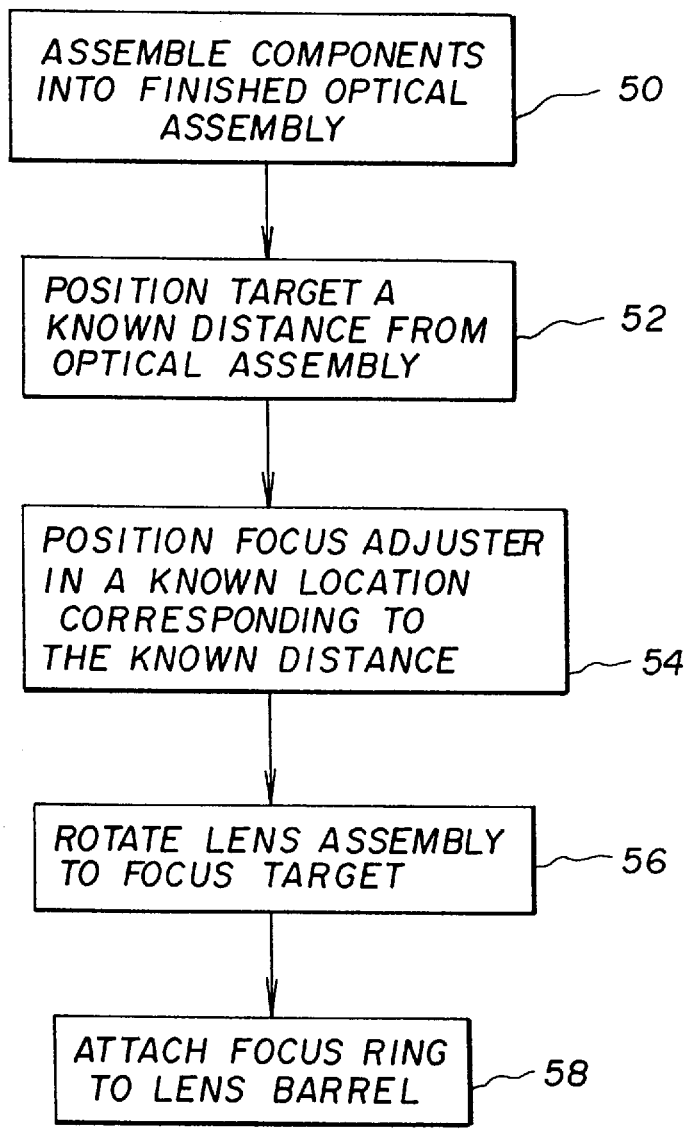
FIG. 6 is a diagram of a method for factory focus of the optical assembly shown in FIG. 1.

The factory focus of the lens 17 includes the following steps, as illustrated in FIG. 6. Initially, in an assembly step 50, the parts are assembled as shown in FIG. 1 into the finished assembly shown in FIG. 5. Then, in a targeting step 52, the target is positioned a known object distance from the optical assembly 10. In a positioning step 54, the focus adjuster 14 is positioned and held in a known location that is associated with the known object distance from the target 25. For example, if the object target 25 that the lens 17 will be focused to in the factory is 12 inches from the lens 17, then the focus adjuster 14 is placed in the position associated with a 12-inch object distance. Note that at this point, the focus ring 18 moves independently from the lens assembly 16.

Next, in a focusing step 56, the lens assembly 16 is rotated by moving the focus tab 42 on the lens barrel 32 (shown in FIG. 5) until the object target 50 is properly focused on the image plane 26 (i.e., where the CCD or film is located). Since the lens barrel 32 has three ramps 28 that are biased (by the lens spring 20) against the three points of the reference locator surfaces 30 on the optics base mechanism 12, a rotational action of the lens assembly 16 causes a translation of the lens 17 (in the z direction 24) relative to the image plane 26. Finally, in an attachment step 58, the focus ring 18 is attached (with glue, or the like) to the lens barrel 32 of the lens assembly 16. Since the focus ring 18 and the lens barrel 32 are bonded together, the lens 17 will translate relative to the image plane 26 when the user rotates the focus adjuster 14.

Figure 7:
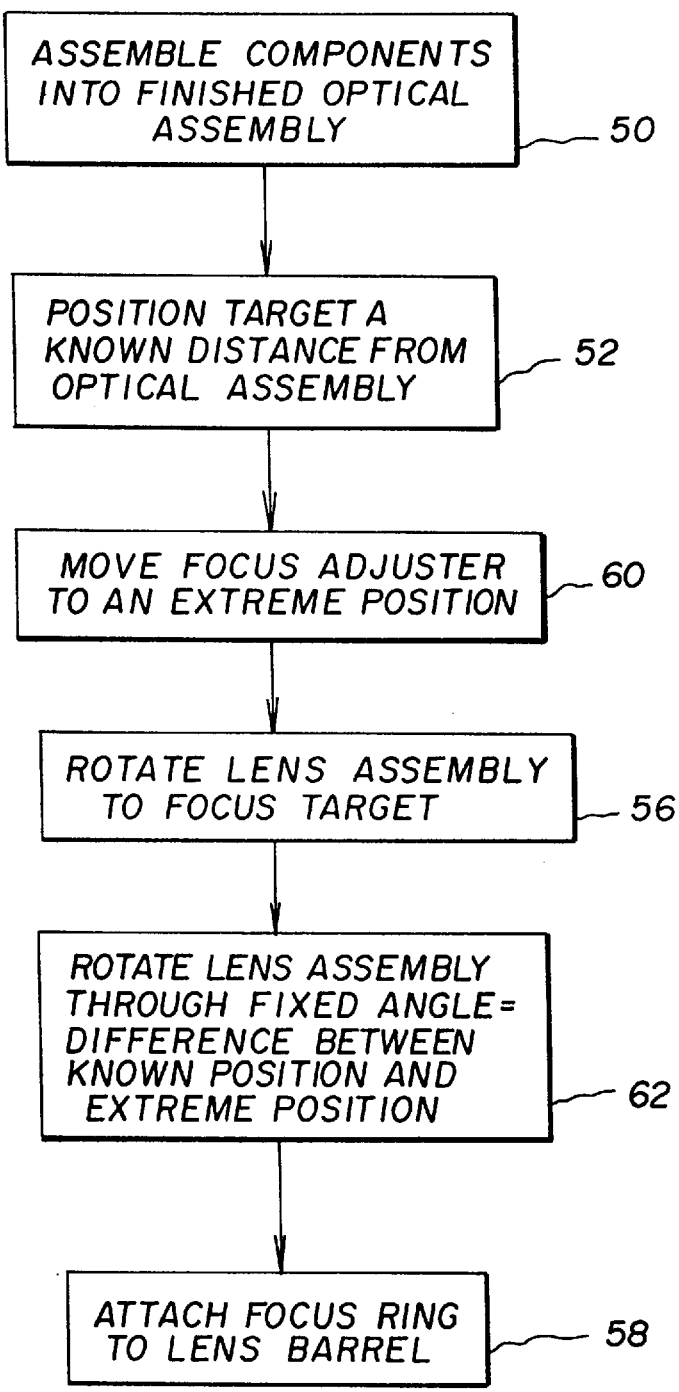
FIG. 7 is a diagram of another method for factory focus of the optical assembly shown in FIG. 1.

An alternative approach for factory focusing of the lens 17 is shown in FIG. 7, and involves, after the aforementioned steps 50 and 52, first moving (positioning step 60) the focus adjuster 14 to one extreme of its motion, e.g., to its infinity position. Then, as in the aforementioned focusing step 56, the focus tab 42 is moved until the object target 25, which is at a predetermined distance from the lens assembly 16, is focused on the image plane 26. Once this focus position is established, the focus tab 42 is used, in an adjustment step 62, to rotate the lens 17 through a fixed angle; this angle of rotation is calculated based on the lens ramp angle and the difference between the lens position associated with the predetermined object target distance and the lens position associated with the focus adjuster position. In effect, the lens 17 is rotated so as to relocate along the z-axis 26 to correspond with the extreme position of the focus adjuster 14. Finally, the focus ring 18 is attached (glue, etc.) to the lens barrel 32. For this approach to be most successful, it should be done automatically (with a fixture controlled by a stepper motor, for example). The advantage of this approach is that it eliminates the tolerance stack-up associated with accurately positioning the focus adjuster 14 in the step 54 described above. This may be important if the lens position associated with the extreme position of the focus adjuster 14 is critical (for example, if the extreme position of the focus adjuster 14 must correspond precisely with an infinity focus position).

The invention has been described with reference to a preferred embodiment. However, it will be appreciated that variations and modifications can be effected by a person of ordinary skill in the art without departing from the scope of the invention. For instance, while the ramps 28 have been shown on the lens assembly 16, and the reference locators 30 have been shown as situated on the optics base mechanism 12, their respective positions may be reversed, i.e., the ramps 28 could be on the base mechanism 12 and the reference locators 30 could be on the lens assembly 16.

PARTS LIST optical assembly
optics base mechanism
focus button
lens assembly
lens
focus ring
lens spring
lens retainer
optical axis
assembly target
image plane
ramps
stop
reference locator surfaces
barrel assembly
opening
extension
pin
tab
shoulder
focus tab
retaining flanges
holes
mounting clips
assembly step
targeting step
positioning step
focusing step
attachment step
positioning step

What is claimed is:

1. An optical assembly adapted for factory focus during a manufacturing operation and user focus during a user operation, said optical assembly comprising:
    a lens assembly having a lens barrel for supporting a lens along an optical axis;
    an optical base having an opening aligned with the optical axis;
    a plurality of ramps and a corresponding plurality of reference locators circumferentially arranged around the lens assembly and the opening in the optical base in order to slide against one another, said ramps and said reference locators providing an arrangement for focusing the lens assembly;
    a retaining element for biasing the lens assembly against the optical base with the ramps and the reference locators likewise biased therebetween against each other;
    a factory focus feature associated with the lens assembly and accessible during the manufacturing operation for focusing the lens assembly by producing relative movement of the ramps and the reference locators; and
    a focus adjuster assembly accessible during user focus for focusing the lens assembly by producing relative movement of the ramps and the reference locators, the ramps and the reference locators thereby providing the adjustment of the lens position during both factory focus and user focus of the lens.

2. An optical assembly as claimed in claim 1 wherein the ramps are circumferentially arranged around the lens adjacent the lens barrel and the reference locators are circumferentially arranged around the opening on the optical base.

3. An optical assembly as claimed in claim 2 wherein the retaining element includes a spring for biasing the ramps of the lens assembly against the reference locators of the optical base.

4. An optical assembly as claimed in claim 1 wherein the focus adjuster assembly includes a focus ring surrounding the lens barrel and a focus adjuster attached to the focus ring and accessible to the user.

5. An optical assembly as claimed in claim 4 wherein the focus ring is bonded to the lens assembly after the factory focus is achieved.

6. An optical assembly as claimed in claim 1 wherein the factory focus feature is a tab extending from the lens assembly.

7. An optical assembly adapted for factory focus during a manufacturing operation and user focus during a user operation, said optical assembly comprising:
    a lens assembly having a lens barrel for supporting a lens and a plurality of ramp surfaces circumferentially arranged around the lens barrel;
    an optical base having a set of reference locators situated around an opening that receives the lens barrel;
    a focus ring surrounding the lens barrel;
    a retaining element for biasing the ramp surfaces of the lens assembly against the reference locators of the optical base, whereby the ramp surfaces are used both during the manufacturing alignment process and the user focus of the lens;
    a focus adjuster attached to the focus ring and accessible during user focus for adjusting the lens assembly by moving the ramp surfaces against the reference locators; and
    a factory focus tab attached to the lens assembly and accessible during the manufacturing operation for adjusting the lens assembly by moving the ramp surfaces against the reference locators, the ramp surfaces thereby providing the sole adjustment of the lens position during both factory focus and user focus of the lens.

8. An optical assembly as claimed in claim 7 wherein the retaining element includes a spring for biasing the ramp surfaces of the lens assembly against the reference locators of the optical base.

9. An optical assembly as claimed in claim 7 wherein the focus ring is bonded to the lens assembly after the factory focus is achieved.

10. An optical assembly, comprising:
    a lens assembly having a lens supported within a barrel and having a plurality of ramp surfaces circumferentially arranged around the lens barrel;
    an optical base having a set of reference pins corresponding in number to the plurality of ramp surfaces;

a retaining element for biasing each ramp surface of the lens assembly against a respective reference pin of the optical base such that relative movement of the ramp surfaces and the reference pins provides the sole adjustment of the lens focus position during both a manufacturing process and during user focus of the lens;

a focus ring surrounding the lens assembly, said focus ring bonded to the lens assembly in correspondence to a factory focus setting; and a focus button attached to the focus ring for user focus of the lens.

11. An optical assembly as claimed in claim 10 wherein the retaining element includes a spring for biasing the ramps of the lens assembly against the reference pins of the optical base.

12. An optical assembly as claimed in claim 10 wherein the lens assembly includes a factory focus tab accessible during the manufacturing operation for adjusting the lens assembly by moving the ramp surfaces against the reference pins.

13. A method for setting the focus of an optical assembly during a manufacturing operation, said optical assembly including a lens assembly and an optical base having arranged therebetween a set of ramp surfaces and a set of reference locators, said optical assembly also having a focus adjuster for user focus of the lens assembly, said method comprising the steps of:

providing a target object at a known object distance from the optical assembly;

biasing the lens assembly against the optical base such that the ramp surfaces abut the reference locators;

positioning the focus adjuster in a known location associated with the known object distance from the target object;

rotating the lens assembly with the ramp surfaces sliding against the reference locators until the target object is properly focused; and attaching the focus adjuster to the lens assembly.

14. The method as claimed in claim 13 wherein the optical assembly has a focus feature accessible during the manufacturing operation and the step of rotating the lens assembly includes using the focus feature to rotate the lens assembly.

15. A method for setting the focus of an optical assembly during a manufacturing operation, said optical assembly including a lens assembly and an optical base having arranged therebetween a set of ramp surfaces and a set of reference locators, said optical assembly also having a focus adjuster for user focus of the lens assembly, said method comprising the steps of:

providing a target object at a predetermined object distance from the lens assembly;

biasing the lens assembly against the optical base such that the ramp surfaces abut the reference locators;

positioning the focus adjuster in a known location associated with a known object distance different than the predetermined distance;

rotating the lens assembly with the ramp surfaces sliding against the reference locators until the target object is properly focused;

calculating a lens rotation angle based on a ramp angle of the ramp surfaces and the difference between the lens position associated with the predetermined distance and the lens position associated with the focus adjuster position;

rotating the lens assembly through the lens rotation angle; and attaching the focus adjuster to the lens assembly.

16. The method as claimed in claim 15 wherein the optical assembly has a focus feature accessible during the manufacturing operation and the two steps of rotating the lens assembly includes using the focus feature to rotate the lens assembly.

17. The method as claimed in claim 15 wherein the focus adjuster is positioned at an extreme position associated with an infinity focus.

\* \* \* \* \*